(12) United States Patent
Yamakawa et al.

(10) Patent No.: US 9,348,036 B2
(45) Date of Patent: May 24, 2016

(54) METHOD AND APPARATUS FOR SUPPLYING BIAS VOLTAGE TO RADIATION DETECTOR

(71) Applicant: Telesystems Co., Ltd, Osaka (JP)

(72) Inventors: Tsutomu Yamakawa, Osaka (JP); Daisuke Hashimoto, Osaka (JP); Tatsuya Nagano, Osaka (JP); Masahiro Tsujita, Osaka (JP)

(73) Assignee: TAKARA TELESYSTEMS Corp., Osaka-shi (JP)

( * ) Notice: Subject to any disclaimer, the term of this patent is extended or adjusted under 35 U.S.C. 154(b) by 106 days.

(21) Appl. No.: 14/012,017

(22) Filed: Aug. 28, 2013

(65) Prior Publication Data
US 2014/0091228 A1 Apr. 3, 2014

(30) Foreign Application Priority Data
Aug. 31, 2012 (JP) ................................. 2012-191766

(51) Int. Cl.
*H01L 27/146* (2006.01)
*G01T 1/24* (2006.01)
(52) U.S. Cl.
CPC ........................................ *G01T 1/24* (2013.01)
(58) Field of Classification Search
CPC ...................................................... G01T 1/24
USPC ........................................ 250/370.08, 370.09
See application file for complete search history.

(56) References Cited

U.S. PATENT DOCUMENTS

| | | | |
|---|---|---|---|
| 6,399,950 B1 * | 6/2002 | Kimura et al. | 250/370.09 |
| 6,765,213 B2 | 7/2004 | Shahar et al. | |
| 7,170,049 B2 | 1/2007 | Iwanczyk et al. | |
| 2005/0139757 A1 * | 6/2005 | Iwanczyk et al. | 250/239 |
| 2011/0121980 A1 | 5/2011 | Doughty et al. | |
| 2011/0210262 A1 | 9/2011 | Prendergast et al. | |

FOREIGN PATENT DOCUMENTS

| | | |
|---|---|---|
| JP | 2000-131440 | 5/2000 |
| JP | 2009-268892 | 11/2009 |

* cited by examiner

*Primary Examiner* — David Porta
*Assistant Examiner* — Meenakshi Sahu
(74) *Attorney, Agent, or Firm* — Harness, Dickey & Pierce, P.L.C.

(57) ABSTRACT

A radiation detecting apparatus includes a radiation detector, a power source, a current detector, and a bias voltage adjuster. The detector includes a semiconductor layer having a compound semiconductor directly converting incoming radiation photons to electric charges and a pair of electrode layers stacked individually on both surfaces of the semiconductor layer. One layer of the paired electrode layers has plural collecting electrodes which enable the semiconductor layer to have one-dimensionally or two-dimensionally arrayed pixels. The power source applies a direct-current bias voltage between the electrodes such that the electric charge is collected to one electrode of the electrodes. The current detector detects current supplied from the power source when the power source applies the bias voltage between the electrodes. The bias voltage adjuster changes a value of the bias voltage applied by the power source depending on a value of the current detected by the current detector.

19 Claims, 8 Drawing Sheets

FIG.7
(A)
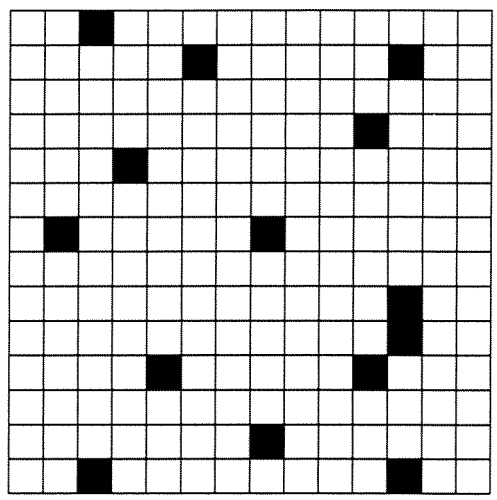
(HV = HVn)
CONVENTIONAL
(B)
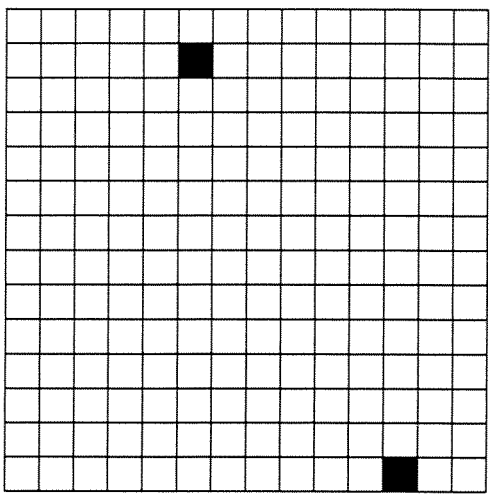
(HV = HVopt)
THE PRESENT EMBODIMENT

METHOD AND APPARATUS FOR SUPPLYING BIAS VOLTAGE TO RADIATION DETECTOR

CROSS-REFERENCE TO RELATED APPLICATION

This application is based on and claims the benefit of priority from earlier Japanese Patent Application No. 2012-191766 filed on Aug. 31, 2012, the description of which is incorporated herein by reference.

BACKGROUND OF THE INVENTION

1. Technical Field of the Invention

The present invention relates to a method and apparatus for supplying, to a radiation detector, a bias voltage for driving the radiation detector, and in particular to a method and apparatus for supplying the bias voltage to a semiconductor detector which detects radiation, such as X-rays, in a state where a voltage is fed to the detector.

2. Related Art

In recent years, in the field of medical diagnostic devices, including X-ray CT scanners and dental X-ray panoramic apparatuses, digital radiation detectors have been adopted by many devices. In such detectors, particular attention is paid to a photon counting type of detector. Such examples are known by JPA 2000-131440 and JPA 2009-268892.

This X-ray detector has a layer member composed of a compound semiconductor which directly converts an incident X-ray beam to an electrical signal which has an amount of electric charges corresponding to an intensity of the X-ray beam, and a pair of charging and collecting electrodes each disposed on both surfaces of the layer member. The compound semiconductor composing the layer member is for example CdTe (cadmium telluride) or CdZnTe (cadmium zinc telluride).

The collecting electrode is sectioned, pixel by pixel, into a group of pixels one- or two-dimensionally arrayed. For the photon counting method, an X-ray beam is detected and its output signal is processed, on the assumption that the X-ray beam is a stream of particles. That is, electrical signals collected by plural collecting electrodes, which are assigned to plural pixels, are processed into digital signals depending on X-ray energy and the number of X-ray photons.

Some circuits for the processing are assembled, as an ASIC (application specific integration circuit) layer, into a layer which contacts the collecting electrode. As a matter of course, the electric signals detected in the X-ray detector can be processed by an electric circuit separated from the detector, not limited to the case where the signals are processed by the ASIC layer. In addition, the detector may adopt an integral-method signal acquisition technique, not limited to adopting the photon counting method.

However, it is difficult to homogenously produce all of compound semiconductors which compose the pixels of an X-ray detector. When being used, the detector receives a certain bias voltage at the collecting electrodes, resulting in flow of a dark current and/or occurrence of a polarization effect.

The dark current is a minute current flowing from the charging electrode to collecting electrodes due to the applied bias voltage, even when there are no incident X-ray beams. The dark current is composed of a current component flowing along edge surfaces of the compound semiconductor, i.e., edge surfaces of the X-ray detector, depending on the surface resistance, and a current component flowing through the compound semiconductor, i.e., through respective pixels. The former current component depends on circumstantial factors such as a surface state and a surface resistance of the compound semiconductor, temperature, and humidity. The latter current component changes due to irregularities in crystal structures of a compound semiconductor when being manufactured, how substrate portions are bonded, how bump bonding is, temperature, humidity, and temperature when the bump bonding is performed The polarization effect is a phenomenon which will cause a detector output to drift gradually during a continuing application of the bias voltage. This phenomenon will occur particularly in compound semiconductors with Schottky structures.

When the dark current flows and/or the polarization effect is caused, the detection performance of each pixel becomes unstable, causing irregularities in output signals from the respective pixels among the pixels, even when there is an incidence of the same amount of X-ray flux at each pixel. In a case where the irregularities in the output signals become excessively large to be over its allowance range, such pixels should be treated as defective pixels. It is noted that, if the polarization effect is excessive, output signals from pixels may change so as to exceed a tolerance range during performing a scan. In this case, the defective pixels themselves increase in number during the scan.

In addition, if there is occurrence of dark current and/or the polarization effect, a dynamic range during which strength of X-rays is detectable correctly narrows. Hence, if such events occur, the number of bad pixels, such as defective pixels with no output, pixels whose outputs are unstable, and/or pixels indicating abnormal outputs compared with other pixels, will become larger, even for incidence of X-rays with higher amounts of flux.

Conventionally it is known to arrange a guard ring around the pixels to physically raise electric resistance to prevent a component of the dark current transmitted along edges of the detector. This guard ring provides the detector sides with a barrier effect against such dark current components. This guard ring is, to some extent, helpful for preventing the dark current from flowing along the sides.

In this way, even if the same X-ray strength arrives at each pixel, larger influences caused by irregularities in the dark current and/or the polarization effect will cause each pixel to output inconstant signals. In order to prevent differences of detection characteristics which are due to the irregularities in the output signals, it is currently necessary to previously check operational conditions of an X-ray detector, which operational conditions give the detector a stable detection performance. Practically it is necessary to take various countermeasures such as regular reset of the bias voltage and control of temperature and humidity in the environment.

However, when such countermeasures are performed, it is necessary to previously test manufactured X-ray detectors to select ones which have a sufficient detection performance for use. A yield ratio in this selection depends largely on production lots. In particular, compound semiconductors such as CdTe have larger irregularities in their production. Hence, keeping such irregularities within a given range results in a rise in production cost of X-ray detectors.

Nevertheless, in addition to the foregoing countermeasures, it is needed to employ post processes for output signals from an X-ray detector, where the post processes include a process for defective pixels and various correction processes for uniformizing an image.

Therefore, In the X-ray detectors which use the compound semiconductor, use conditions are largely restricted due to irregularities in the dark current and/or the polarization effect, and an amount of calculation necessary for the post processes increases.

The foregoing drawbacks are always associated with occurrence of the dark current and/or the polarization effect and not related to types of X-ray detectors. Even an integration type of detector, which outputs, as an X-ray detection signal, an integrated value (for a given period of time) of an output signal from the detector is confronted with the same drawbacks. Further, gamma rays have the same situation as the above, not limited to the X-rays.

SUMMARY

In consideration of the foregoing, in the radiation detector which uses the compound semiconductor to directly convert radiations such as X-rays to electric signals, it is desired to secure a larger and constant dynamic range for detecting the radiations even when there are influences of the dark current and/or the polarization effect and it seemed difficult, in the past, to use the detector due to presence of a number of bad pixels, and thus to enable the detection with lesser bad pixels from low to high X-ray fluxes.

According to the disclosure, as one preferred mode, a radiation detecting apparatus is provided. This apparatus comprises a radiation detector comprising a semiconductor layer consisting of a compound semiconductor which directly converts an incoming radiation photon to an electric charge and a pair of electrode layers stacked individually on both surfaces of the semiconductor layer, wherein one of two electrode layers of the paired electrode layers is structured into a plurality of collecting electrodes which enable the semiconductor layer to have one-dimensionally or two-dimensionally arrayed pixels; a power source that applies a direct-current bias voltage between the pair of electrodes such that the electric charge is collected to one of the pair of electrodes; a current detector that detects current supplied from the power source when the power source applies the bias voltage between the pair of electrodes; and a bias voltage adjuster that changes a value of the bias voltage applied by the power source depending on a value of the current detected by the current detector.

Another mode of the disclosure provides a method of adjusting a bias voltage in a radiation detecting apparatus comprising a radiation detector comprising a semiconductor layer consisting of a compound semiconductor which directly converts an incoming radiation photon to an electric charge and a pair of electrode layers stacked individually on both surfaces of the semiconductor layer, wherein one of two electrode layers of the paired electrode layers is structured into a plurality of collecting electrodes which enable the semiconductor layer to have one-dimensionally or two-dimensionally arrayed pixels; and a power source that applies a direct-current bias voltage between the pair of electrodes such that the electric charge is collected to one of the pair of electrodes. In this method, current supplied from the power source is detected when the power source applies the bias voltage between the pair of the electrodes; and a value of the bias voltage applied by the power source is changed depending on a value of the detected current.

By the above supply apparatus and adjusting method for the bias voltage, the foregoing objectives can be met.

BRIEF DESCRIPTION OF THE DRAWINGS

In the accompanying drawings:

FIGS. 7A and 7B are views which explain qualitatively an advantage derived from setting of the bias voltage to its optimum value.

DETAILED DESCRIPTION OF THE PREFERRED EMBODIMENTS

Referring to the accompanying drawings, an embodiment and a modification of a radiation detecting apparatus according to the present invention will now be described.

With reference to FIGS. 1-7, an embodiment of the radiation detecting apparatus will now be described.

Figure 1:
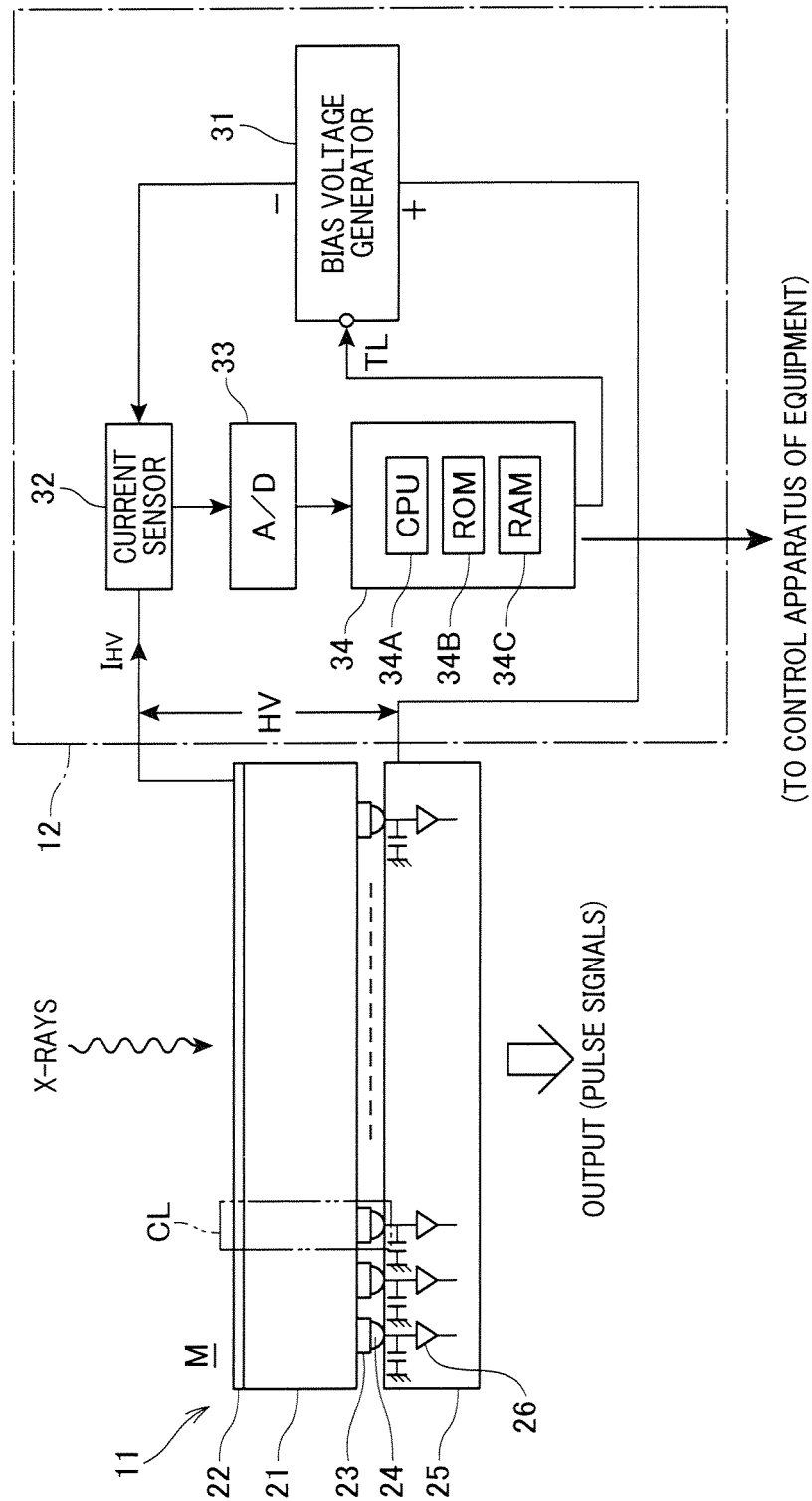
FIG. 1 is a block diagram showing an apparatus which drives an X-ray detector, which is according to one embodiment of the an apparatus and method of driving a radiation detector according to the present invention.

FIG. 1 shows the configuration of an X-ray detecting apparatus which detects X-rays, which apparatus serves as the radiation detecting apparatus. This X-ray detecting apparatus is provided with an X-ray detector 11 (hereinafter simply referred to as a detector) serving as the radiation detector and an apparatus 12 (hereinafter referred to as a bias voltage supplying unit) which applies a driving bias voltage to this detector 11. This bias voltage supplying unit 12 is a drive unit which drives the detector 11. This bias voltage supplying unit 12 has the capacity to perform a method of adjusting suitably values of the bias voltage.

The detector 11 and the bias voltage supplying unit 12 are mounted on, for example, a dental panoramic X-ray imaging apparatus which images tomographic images of a patient's jaw. An example of mounting this apparatus will be described later.

By the way, it is not always limited to a case where the detector 11 is mounted on the dental panoramic X-ray imaging apparatus. As long as, what is called, a direct conversion type of X-ray semiconductor detector is used which employs a semiconductor layer composed of compound semiconductor directly converting X-ray photons, incoming to the detector 11, to current, any type of apparatus may be provided. For example, an X-ray CT scanner or X-ray mammography apparatus may be provided. In addition, the radiation being detected is not limited to X-rays, but gamma rays may be used.

The detector 11 is a semiconductor detector, in which compound semiconductor such as cadmium telluride (CdTe) or cadmium zinc telluride (CdZnTe) is used to detect incoming X-rays as electric signals depending on the X-ray strengths. For details, this detector 11 is, what is called, a photon-counting and direct-conversion type of semiconductor detector which outputs a pulsed electric signal converted from each X-ray photon every time the X-ray photon comes in. This photon-counting type of semiconductor detector is already known by for example JP-A 11-337645. Alternatively this semiconductor detector may be replaced with an integral type of X-ray detecting circuit which integrates an X-ray detection signal, at intervals, for a given interval.

As shown in FIG. 1, the detector 11 according to the present embodiment is provided with a semiconductor layer 21, a charging electrode 22, a plurality of collecting electrodes 23, and an ASIC (application specific integration circuit) layer 25 described later. The semiconductor layer consists of a single crystal plate made of CdTe adopted from the foregoing exemplified compound semiconductors. The charging electrode is stacked on one of the surfaces of the semiconductor layer 21 in the thickness direction thereof and the collecting electrodes are stacked on the other surface. By way of example, the semiconductor layer 21 has a thickness of approx. 1.0 mm. The charging electrode 22 is a single thin plate-shaped electrode stacked and spread on the one surface of the semiconductor layer 21. On the other hand, each of the collecting electrodes 23 functions as one pixel, and is composed of a small square chip 0.2 mm, for example. By way of example, the collecting electrodes 23 are composed of 40×40 pieces of electrodes two-dimensionally arrayed in a grid from with a gap of a given distance (e.g., 40 μm) formed between two of the electrodes.

In this fundamental structure, the single collecting electrode 23 provides a cell CL (i.e., pixel) which is the smallest collection unit, which is able to acquire a pair of hole and electron generated responsively to incidence of an X-ray photon. The smallest collection unit is composed of a portion of the semiconductor layer 21 and a portion of the charging electrode 22, which portions positionally correspond to one of the collecting electrodes. Hence, the cells of, for example, 40×40 pieces are arrayed in a grid form to provide a single module M. FIG. 1 pictorially shows the one module M.

Further, in this detector 11, there are solder bumps 24 arranged on the surfaces of the respective collecting electrodes 23, each of the solder bumps 24 is electrically connected to a processing circuit for each acquisition channel set every cell CL of the ASIC layer 25.

In the embodiment, the detector 11 includes the semiconductor layer 21, the charging electrode 22, the collecting electrodes 23, the solder bumps 24, and the ASIC layer 25. These layer members are made as a monolithic structure. In other words, the detector 11 is an all-in-one device in which the members including a processing circuit for detected signals are integrated into a layer structure. On the other hand, this detector 11 is just an example, not always limited to such all-in-one structure. For example, the processing circuit can be produced such that lead wires connected to the respective solder bumps 24 are electrically connected, every acquisition channel, to a separate processing circuit. In this separate structure, the detector 11 is constructed by the semiconductor layer 21, the charging electrode 22, the collecting electrodes 23, and the solder bumps 24.

By the way, the foregoing size (200 μm×200 μm) of each pixel is set to be smaller enough for detecting an X-ray as photons (particles). In the embodiment, the size with which the X-rays are detectable as particles is defined as "a size which makes it possible to substantially disregard occurrence of superposition phenomena (or referred to as pileups) between or among electric pule signals respectively responding to plural radiation particles (e.g. X-ray particles) which come in series at the same position or nearby positions or to estimate amounts of the superposition". When the superposition phenomena occur, there are counting losses of the X-ray particles in a characteristic showing "the number of incidences and the counts thereof" of the X-ray particles. Hence, the size of each of the pixels provided in the detector 11 is produced to prevent the counting losses, produced as a size with which it can be regarded that the counting losses are substantially prevented, or produced as a size with which the counting losses can be estimated.

The X-ray detection according the present embodiment is based on a photon-counting technique. The processing circuit incorporated in the ASIC layer 25 is thus able to perform processes based on the number of photons and energies of the photons, every acquisition channel, i.e., every pixel, although not shown in detail. The circuit for the processing includes a charge amplifier which receives an analog electric signal in each acquisition channel (refer to a reference 26 in FIG. 1). Furthermore this circuit includes, on the output side of the charge amplifier, a waveform shaping circuit, multiple-stage comparators, an energy range distribution circuit, multiple-stage counters, multiple-stage D/A converters, and a serial converter. This configuration, the X-rays can be detected as particles thereof and information about energy of the particles can be picked up, pixel by pixel, as X-ray detection outputs.

Figure 2:
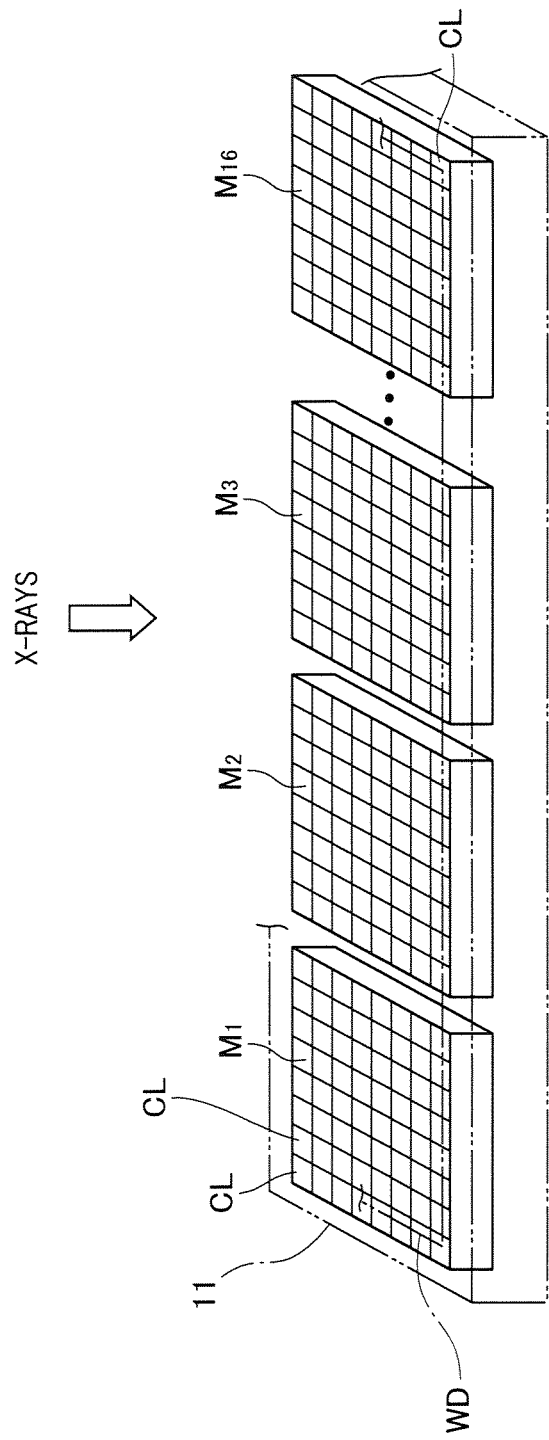
FIG. 2 is a perspective view, partly omitted, which outlines an X-ray detector adopted by an embodiment.

A plurality of modules $M_1, M_2, \ldots M_{18}$, for example 18 pieces, in which each module M is configured as above, are arranged discreetly in a tandem form in a state where there is a gap of a given distance between two modules, as shown in FIG. 2. As a whole, a narrow-width and long rectangular pixel group, which is composed of 40×720 pixels, is provided. This provides the signal detector 11 with an elongated and rectangular X-ray incidence surface WD. This detector is preferably mounted in a dental digital panoramic imaging apparatus.

Meanwhile, the bias voltage supplying unit 12 shown in FIG. 1 is provided with a bias voltage generator 31 serving as a variable power source, a current sensor 32, an A/D convertor 33, and a bias voltage control circuit 34.

Of these elements, the bias voltage generator 31 has the capacity to apply a direct-current bias voltage between the charging electrode 22 and the collecting electrodes 23. As descried, the charging electrodes are used in common for the respective pixels stacked on one surface in the detector 11 and the collecting electrodes provide the respective pixels.

In particular, the bias voltage generator 31 according to the present embodiment has a control terminal TL, and is configured to generate a DC bias voltage in response to a control signal given to the control terminal TL. This generator is also configured to change the bias voltage within, for example, a given range including a range from −300 V to −200 V. The bias voltage generated by this bias voltage generator 31 is applied between both electrodes 22 and 23 via lines 35A and 35B in such a manner that the charging electrode 22 receives a negative potential ("−" potential pole side). This application of the DC bias voltage will cause an electric field oriented from the "+" electrode 23 to the "−" electrode 22 in the semiconductor layer 21. As a result, this electric field enables movement of holes and electrons, generated responsively to an incoming X-ray beam to the semiconductor layer 21, to both electrodes 22 and 23, respectively.

In detail, when an X-ray photon collides with semiconducting crystals in the semiconductor layer 21, the crystals are disconnected so as to generate a number of pairs of holes and electrons. The number of such pairs is proportional to an amount of energy of each X-ray photon. The electrons move to each collecting electrode 23 which is relatively charged to the positive potential, while the holes move to the charging electrode 22 which is relatively to the negative potential.

This movement is done through repeated operations with which an electron moves from an adjacent crystal coupling to a hole from which an electron has already moved. In a transition during which the moved holes and electrons are caught by the electrodes 22 and 23, each of the collecting electrodes 23 (i.e., pixels) of the detector 11 outputs an electric pulse single induced depending on an amount of energy of an incident X-ray photon. This pulse signal is outputted every time an X-ray photon strikes each pixel. Of course, all of the generated holes and electrons are not always caught by the electrodes 22 and 23, but some of them will disappear during their movements.

The current sensor 32 is for example a resistor having a lower resistance, and inserted in the line 35A connecting the negative terminal of the bias voltage generator 31 and the charging electrode 22. Hence, the current flowing through the lines 35A and 35B responsively to an application of the bias voltage outputted from the bias voltage generator 31, that is, the amount of current in association with the bias voltage application performed for each of the modules M composing the detector 21 can be detected as an analogue current. The current sensor 32 may be disposed in the other line 35B.

The detected analogue current is sent to the A/D converter 33, where the current is converted to a digital current signal by this converter 33. This digital current signal is then provided to the bias voltage control circuit 34.

In the present embodiment, the bias voltage control circuit 34 is configured as a microcomputer provided with a CPU 34A, a ROM 34B and a RAM 34C. Instead of this microcomputer, this circuit may be configured to use a function generator or digital logic circuits.

This bias voltage control circuit 34 is configured to make reference to a table in which digital amounts of currents to be inputted are previously stored, so that this control circuit sets the value of a bias voltage which should be generated by the bias voltage generator 31. In addition, this bias voltage control circuit 34 is able to send to the control terminal TL of the bias voltage generator 31 a control signal corresponding to the bias voltage value which has been set. This output of the control signals is repeatedly carried out when being particularly instructed by a user or during a time in which, for example, a dental panoramic imaging apparatus scans a patient's jaw with X-ray beams. The user's particular instructions will be issued when equipment provided with this detector 21, for example, a dental panoramic imaging apparatus is in preparation for operations or maintained for management.

When receiving the control signal, the bias voltage generator 31 generates a bias voltage whose value is designated by the control signal. If the control signal indicates a value of the DC bias voltage lower than the value of the currently generated DC bias voltage, the bias voltage generator 31 generates a bias voltage whose value is lower than the current value thereof. Therefore, although the value is maintained within a range of the bias voltage for driving the detector 21, the voltage value can be increased or decreased.

The reason why the bias voltage (i.e., driving voltage) applied to the detector 11 should be controlled will now be explained. Controlling the bias voltage is an essence of the present invention.

Figure 3:
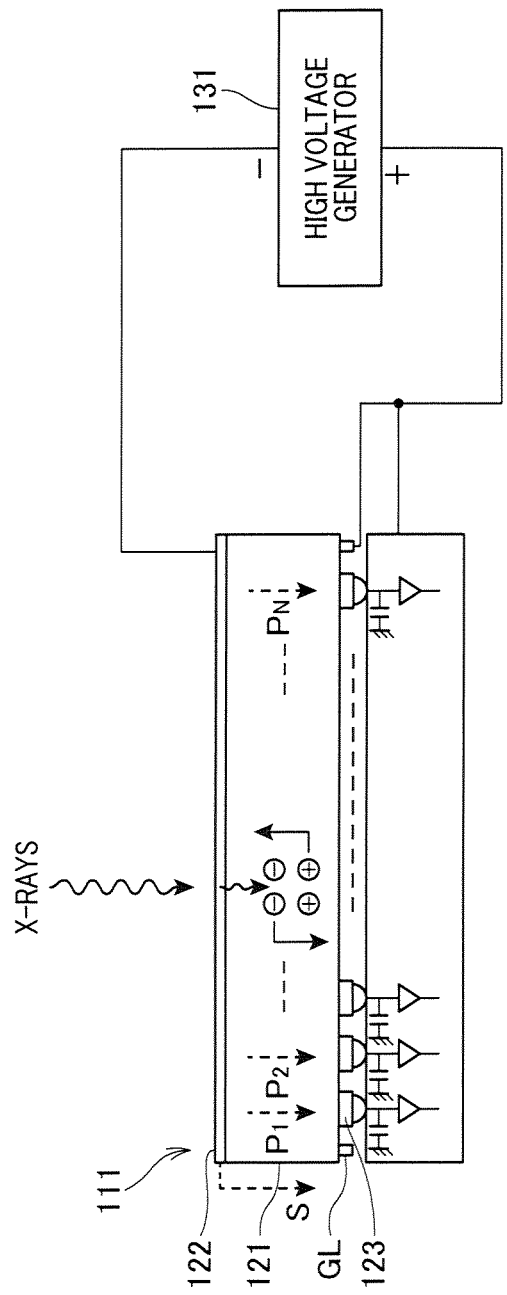
FIG. 3 is a view explaining how dark current behaves.

FIG. 3 shows a connection of a detector (with one module) whose configuration is the same as the above and a bias voltage generator 131 for driving the detector 111. This bias voltage generator 131 is a device conventionally used, and is configured to apply a predetermined constant value (e.g. −300 V) of bias voltage between a charging electrode 122 and collecting electrodes 123.

When this bias voltage is applied, dark current $I_D$ flows inevitably even when there are no incidences of X-ray photons. In terms of the moving direction of the electrons, the dark current $I_D$ flows from the charging electrode 122 to the collecting electrodes 123, finally being mixed into a detection signal outputted from each pixel.

The dark current $I_D$ consists of current components S that flow along and on side surfaces of the compound semiconductor, that is, the semiconductor layer 121 (i.e., module) and current components $P_1$-$P_N$ that are generated in the semiconductor layer 121 and reach the respective collecting electrodes 123. The former current component S varies depending on various factors such as surface conditions, surface resistance, humidity, temperature and/or produced states of crystals of the semiconductor layer 21. Meanwhile, the latter current components $P_1$-$P_N$ vary depending on such factors as produced states of the semiconductor crystals, bound states of the electrodes, humidity, temperature, how the solder bumps are formed, and/or temperature of the solder at which the bumps are formed.

As is known, the former current component S can be reduced partially by a guard ring GD (refer to FIG. 3) on the semiconductor layer 121 such that the guard ring surrounds the collecting electrodes on the semiconductor layer 121. However, arranging the guard ring GD changes delicately an electric field distribution at peripheral collecting electrodes among the two-dimensionally arrayed collecting electrodes 123 (that is, at semiconductor crystals of peripheral pixels), compared with the other electrodes. This change in the electric field distribution is attributable to, for example, irregularities in working accuracy on end faces of the semiconductor crystals (CdTe). This results in unstable detecting operations of peripheral pixels.

Similarly, at the latter current components $P_1$-$P_N$, differences in the detection characteristics of the pixels are caused, due to variations in various conditions and/or differences in environmental stress when being used.

Figure 4:
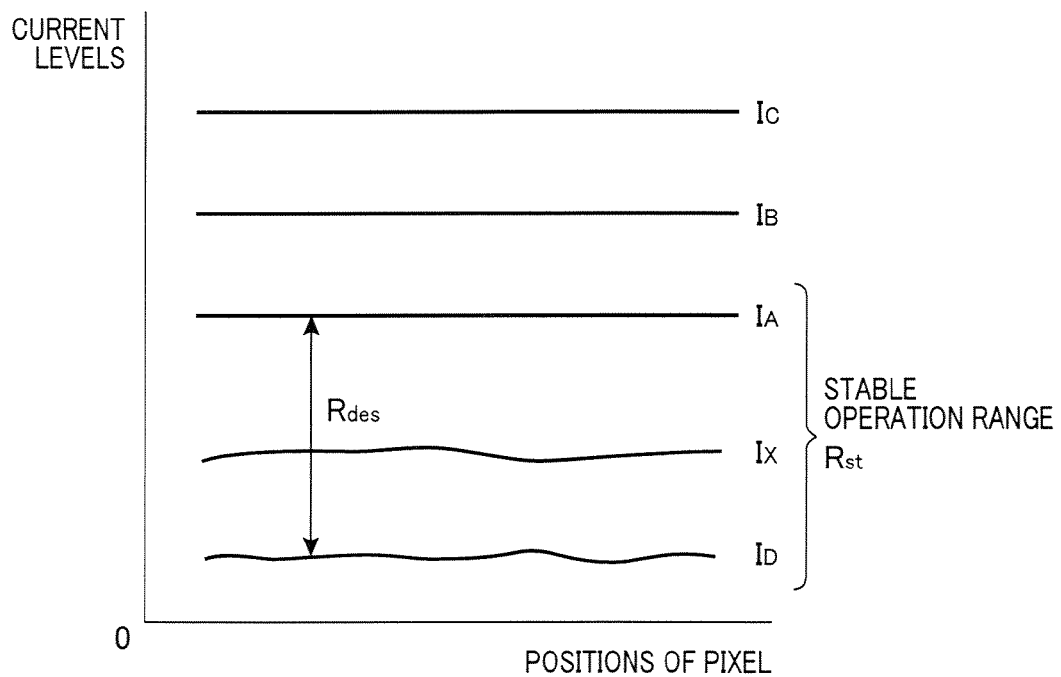
FIG. 4 is a graph explaining a relationship between a level of the dark current and a stable operation range at each pixel.

FIG. 4 shows a model explaining a stable operation range which depends on current generated inside the semiconductor layer (compound semiconductor) and levels of the dark current. In the figure, the stable operation range $R_{st}$ ranges from a level of current=0 to a level $I_A$ over which pixels becomes unstable in their operations (including influences of the polarization effect). A level of $I_B$ over which pixel outputs changes extremely and a level $I_C$ over which a pixel can be regarded as being defective are present over the level $I_A$. In the stable operation range $R_{st}$, there are, from the bottom, a level showing the dark current $I_D$ and a level showing current $I_X$ (to be detected) generated responsively to excitation by X-ray photons and superposed on the dark current $I_D$. From this, it can be understood that the wider a range $R_{des}$ between the current levels $I_A$ and $I_D$, the wider the dynamic range for the current $I_X$ that can be detected.

That is, in the pictorial illustration shown in FIG. 4, it can be seen that, when the amount of the dark current $I_D$ becomes larger, the range $R_{des}$ which enables a stable detection of X-ray particles becomes narrower. When the dark current $I_D$ differs in amounts from one another among pixels, the detectable range $R_{des}$ also differ from one another among pixels. In these cases, there exist pixels which output current over the limit of the detectable range $R_{des}$, i.e., the current level $I_A$. Such pixels exhibit extremely unstable X-ray detection characteristics, which results in difficulty in use. Especially if pixels output current exceeding the current level $I_C$, such pixels are defective so that the pixels are unusable. As the amount of the current $I_X$ becomes larger, a percentage of the pixels showing the unstable detection characteristics and/or the defective pixels becomes higher.

In consideration of this fact, the inventors focused on the relationship between the dark current $I_D$ and the bias voltage HV applied to the compound semiconductor, that is, to the semiconductor layer 21, and confirmed through experiments that lowering the bias voltage HV results in a decrease in the amount of the dark current ID, thus widening the stably detectable range $R_{des}$. The inventors also confirmed that lowering the bias voltage HV excessively, i.e., making strength of an electric field generated in the semiconductor layer 21 too small, the number of electrons which are trapped within the semiconductor crystals without moving to the collecting electrodes 23 increases, whereby all the electrons are not collected. Hence, it was confirmed that there exists a lower limit of the bias voltage HV which prevents such a trap.

Based on this knowledge, the circuitry shown in FIG. 1 is used to control the bias voltage HV as follows. Current $I_{HV}$ flowing to the bias voltage generator 31 is detected by the current sensor 32, and this 1:5 current value $I_{HV}$ is converted to a digital amount by the A/D converter 33 and sent to the bias voltage control circuit 34. In this bias voltage control circuit 34, the CPU 34A controls the drive of the bias voltage generator 31 in accordance with the detected current amount $I_{HV}$ to change the value of the bias voltage HV to be outputted from this generator 31. In principle, the control is performed such that the value of the bias voltage HV is reduced with an increase in the detected current value $I_{HV}$.

However, from a viewpoint that the detection performance of the detector 11 is required to be maximized, a voltage range permitted to be changed is limited for itself. Hence, it is required that, for incoming X-ray photons having the same amount of energy, there are no significant differences in amounts of collected electric charges among the pixels even when the bias voltage HV is changed such that "the dark current $I_D$+the X-ray detection current $I_X$" is maintained at a constant as much as possible.

Meanwhile, when the bias voltage HV is changed rapidly in time, the charge amplifiers, incorporated in the ASIC layer for the respective pixels, may output pseudo-pulses or the circuit may be damaged. It is therefore required to limit speeds at which the value of the bias voltage HV is changed. Hence, the following packaging conditions were set.

First, it was assumed that the detector 11 is mounted in a dental panoramic imaging apparatus, which has typical specifications shown as follows.
- the semiconductor layer of the detector 11 is made of CdTe structured to have a Schottky junction, where a pixel size is 8 mm×8 mm and a thickness is 1 mm;
- the pixel sizes is 200 µm×200 µm;
- the number of pixels per module is 40×40=1600 pixels;
- the charging electrode is made of platinum (Pt) and the collecting electrodes are made of aluminum (Al);
- in the ASIC layer, a charge amplifying circuit is incorporated pixel by pixel; and
- the bias voltage applied to the detector 11 is controlled such that a negative voltage is applied the charging electrode and change between −200 to −300 V.

In those implementation conditions, the inventors conducted experiments, which showed that it preferred that a changing speed of the voltage of 50 V/second or thereabouts was preferred by way of example, and the voltage was changed in proportion of time (linearly in the graph), as shown in FIG. 2. It was confirmed that, if this speed condition was met, the detector outputs were not influenced by changes in the bias voltage and changes in the X-ray strengths depending on different portions of an object were sufficiently traced in real time during imaging a panoramic image, i.e., during a scan, even if the bias voltage HV was changed while data were acquired under the X-ray radiation. According to the inventors' knowledge, the foregoing voltage changing speed can be set within a range of 10 V/second to 100 V/second, which is off course dependent on the implementation conditions and/or application conditions of the bias voltage.

Figure 5:
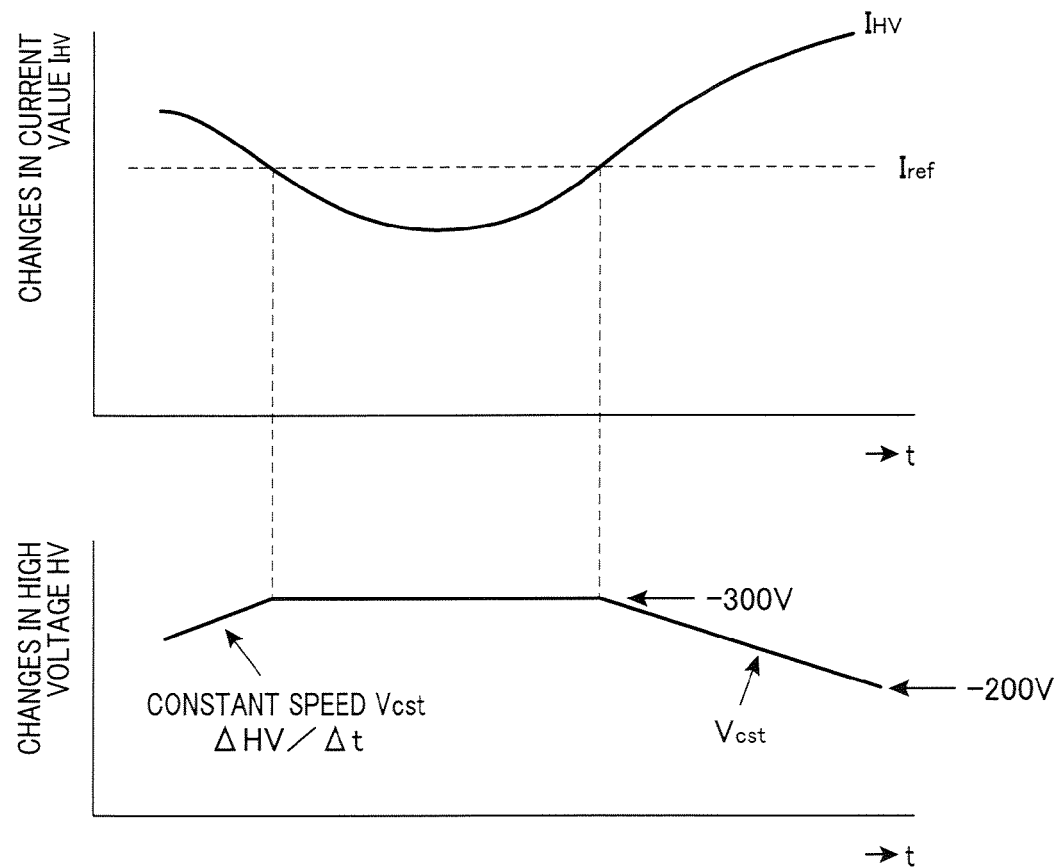
FIG. 5 is a graph explaining a relationship between i) values of current flowing from a bias voltage generator to the X-ray detector and ii) values of bias voltage applied to the X-ray detector.

The procedure for changing the bias voltage HV can be conceptually explained in FIG. 5 such that the bias voltage generator 31 is controlled so as to apply the bias voltage of −300 V when detected current is equal to or less than a current value $I_{ref}$ (including the dark current) which is decided by X-rays having a reference flux value. In a case where the value of the detected current $I_{HV}$ increases so as to exceed the value $I_{ref}$, the bias voltage is reduced down to −200 V at a constant speed $V_{cst}$ depending on how faster the voltage has been increased, as shown in FIG. 5. The constant speed $V_{cst}$ can be defined as a constant speed proportional to a value calculated by dividing the normal application voltage per unit time by an acquisition time. In this embodiment, this constant speed $V_{cst}$ is set to 50 V/sec which is closer to an intermediate value between 10 V/sec to 100 V/sec. Alternatively this speed may be changed properly depending on factors such as acquisition conditions provided that it is possible to suppress sudden changes in the detected signals from the detector 11.

In addition, in a state X-rays having a reference flux value are radiated to the detector 11, amounts of the current $I_{HV}$ flowing through the bias voltage generator 31 are checked always, during which the bias voltage HV is reduced. The current $I_{HV}$ is detected as a detection current $I_X$ in which the dark current $I_D$ is superposed (refer to FIG. 4), it is checked such that the detected current $I_{HV}$ is below the upper limit $I_A$ of the stable operation range with a constant margin between the upper limit and the detected current. This check operation is repeatedly performed until the bias voltage HV arrives at a lower limit (for example, −200 V). Although the current arrives at the lower limit but the value of the detection current IHV has not been below the upper limit IA of the stable operation range, it can be concluded that the module M or the pixel CL, or the detector 11 is defective.

Hence, in the present embodiment, the process changing the bias voltage HV can be conducted as a process for detecting bad pixels CL or bad modules M in the detector production. Normally the pixels are produced module by module, so that if there are an allowable number of bad pixels in one module, the module will not be used. In general the module is high in its production cost, so if such unusable modules are found, a yield rate of production of the detector becomes lower, affecting production cost of an equipment to be produced with the detector. It is therefore best to know non-defective or detective of each module before assembling modules. It is also best if it possible that defective modules, which should be removed in the past as being defective, can be classified into a non-defective group through adjustment of the bias voltage HV applied for their drive, according to the technique provided in the present embodiment.

In the present embodiment, based on a relationship between the dark current $I_D$ and the applied bias voltage HV, it is possible to search an optimum bias voltage HV which is common for all the modules M (that is, the detector 11). This search is based on the knowledge that a reduction in the bias voltage HV will lead to a reduction in the dark current $I_D$.

Hence, the present embodiment makes it possible that bad pixels are made to appear by reducing the bias voltage HV from a given value, in order to evaluate if the detector is still non-defective when considering the fact that the number of bad pixels are the least or below an allowable number. This is provided by a process for searching an optimum value of the bias voltage HV and for setting thereof. In other words, if an optimum value of the bias voltage HV, which is to drive the detector 11, is found, it is unnecessary to dispose of the detector 11 as being a defective product.

Hereinafter, a process for searching and setting an optimum value of the bias voltage HV will now be explained.

[Searching and Setting an Optimum Value of the Bias Voltage HV]

Figure 6:
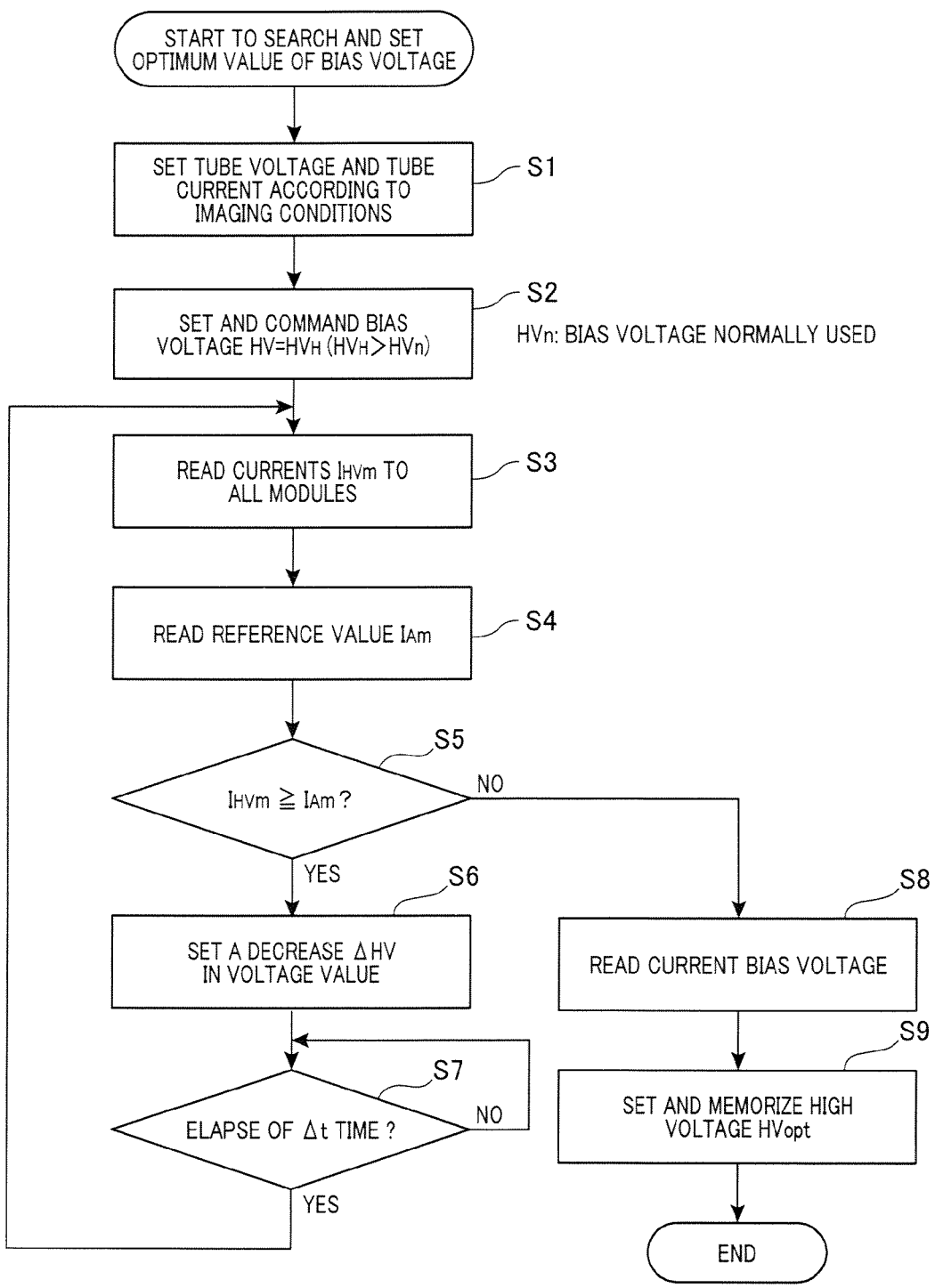
FIG. 6 is a flowchart which outlines a process according to search and setting of an optimum value of the bias voltage in consideration of existence of the dark current.

A process shown in FIG. 6 is started responsively to, for example, a command from the CPU 34A of the bias voltage control circuit 34. This example shows a situation where, as a preparation before driving a target equipment, an optimum value of the bias voltage HV is searched and set.

When this bias voltage changing process is started, the CPU 34A commands a tube voltage and a tube current of an X-ray tube depending on imaging conditions including temperature and humidity of an environment in which the equipment is used, and a reference value of strength of the X-ray beams (step S1). Such the tube voltage and current are given each time or set as being default values. These commands are sent, although not shown, from the bias voltage control circuit 34 to the equipment provided with the detector 11 (for example, a dental panoramic imaging apparatus), where the tube voltage and current are provided to a bias voltage unit to apply the bias voltage to the X-ray tube. The X-ray tube responds to this, so that the X-ray tube radiates for example continuous X-rays whose strength is in accordance with a reference value which corresponds to the commanded tube voltage and current.

The CPU 34A then sets a bias voltage $HV_H$ (>HVn) whose value is higher than the normally set bias voltage HVn (for example, −300 V) which is normally applied to the detector 11, and commands the set value $HV_H$ to the bias voltage generator 31 (step S2). This higher bias voltage HVH is for example −350 V. Raising the bias voltage like this is to widen a range during which bad pixels caused by the dark current will appear. As a result, for example, the voltage of −350 V is applied to all the modules of the detector 11 in parallel. Explanations stated here about "high" and "low" about the voltage are based on its absolute values.

The CPU 34A reads, via the current sensor 43 and the A/D converter 33, a current value $I_{HVm}$, which is a sum of currents flowing between all the modules and the bias voltage generator 31, depending on X-ray beams having the reference value (step S3). The current $I_{HVm}$, which is the sum of currents, can be regarded as being a representative value of indexes showing influences of irregularities in the dark currents and the polarization effect.

The CPU 34A then reads a reference value $I_{Am}$ from the ROM 34B to its work area (step S4), wherein the reference value is previously stored in the ROM. The reference value $I_{Am}$ indicates a sum of the upper current values $I_A$ of the foregoing stable operation ranges $R_{st}$ (shown in FIG. 4) for all the modules M. The suffix "m" is attached for the distinction.

The CPU 34A then compares the detected current $I_{HVm}$ for all the modules M with the reference value $I_{Am}$. That is, it is determined whether or not $I_{Am} \leq I_{HVm}$ is established (step S5). If it is determined YES at this step, the bias voltage HV is reduced by a ΔHV (e.g. 10 V), because the value of the dark current $I_D$ is still larger at this time. That is, the bias voltage HV is reduced to $HV_H$−ΔHV by providing the bias voltage generator 31 with a changed command indicating a bias voltage "$HV_H$−ΔHV" (step S6). Accordingly the bias voltage generator 31 applies the reduced bias voltage "$HV_H$−ΔHV" between both the electrodes 22 and 23.

The CPU 34A then waits for a predetermined period of time Δt (step S7). This time Δt is set to keep the foregoing constant speed $V_{cst}$ (for example, 50 V/sec) determined with regard to the voltage changing speed.

The steps S3 to S7 are repeated until it is determined NO at step S5. During the repeated actions, the bias voltage HV is gradually reduced in steps of ΔHV, which makes the dark current $I_D$ reduce little by little, resulting in that an optimum value $HV_{opt}$ of the bias voltage HV is searched.

When it is determined NO at step S5, the package condition of $I_{Am} \leq I_{HVm}$ for all the modules M has been met. Hence, the PCU 34A reads the currently set value of the bias voltage HV from the RAM 34C (step S8). The CPU regards the currently read value as being the most optimum value $HV_{opt}$ of the bias voltage HV which should be applied to the detector 11 which is now searched, and stores the optimum value is in the RAM 34C and transmits the optimum value to external control systems.

Alternatively the foregoing search and setting process may be performed every module. Practically a plurality of the modules M are placed in the radiation field of the foregoing X-ray beams, and the search and setting process shown in FIG. 6 can be performed for each of the modules with a switchover thereamong. This technique enables setting of an optimum bias voltage value $HV_{opt}$ for each module, in which the optimum bias voltage value makes the number of defective pixels reduce below an acceptable number. This search and setting process for each module becomes helpful checks in the production and/or in use at users' sites.

The advantage of the foregoing process can be pictorially explained in FIG. 7. FIG. 7(A) shows appearance of many unstable pixels (one mode of bad pixels) at each of which current exceeds the level $I_A$ due to influences of the dark current and/or the polarization effect, as described. In other words, this figure shows that, in a state where the bias voltage value HV is −HV, which is normally used, if only the X-ray detection current $I_X$ had flowed, the current detected at each pixel would not have exceeded the current level $I_A$. When there are lots of unstable pixels, much noise will occur whenever the equipment is used and/or artifacts will be caused in images. It may be difficult to correct noise or artifacts by a post correction process once being imaged.

In contrast, in the present embodiment, the modules or detector can be driven after adjusting the bias voltage HV to its optimum value −$HV_{opt}$ every module or every detector. This suppresses the influences of irregularities in the dark current and/or the polarization effect, so that, as illustrated as an example in FIG. 7(B), appearance of bad pixels such as unstable pixels is suppressed down to a usable level. Therefore, modules and/or detectors which should be disposed under the conventional usage can be revived by adjusting the bias voltage on user's side, and the revived ones can still be used well. Additionally irregularities in the detection characteristics among the pixels can also be suppressed.

To put it simply advantages of the present embodiment according to the present invention, even if there are differences of natural environments in production, differences of indoor conditions in usage, and individual differences in detection performance among the detectors which are due to production thereof, the dark current $I_D$ can be reduced to obtain a wider dynamic range and irregularities in the operations can be lowered among the pixels. In other words, modules, which are regarded as being defective ones and rejected under the conventional driving technique, are revived by the usage according to the embodiment. Unlike the conventional, the number of pixels from which signals are needed to be corrected is reduced. In consequence, a yield rate of selecting modules in assembling a detector increase, and stable images are provided.

[Modifications]

In the foregoing embodiment, an optimum value of the bias voltage HV applied to the detector 11 is searched and set before imaging a patient using an equipment provided with the detector 11, for example, a dental panoramic imaging apparatus. Alternatively to this mode, such an optimum value may be searched and set during actual imaging of a patient.

As the dental panoramic imaging apparatus, an apparatus exemplified by JP-A 2011-085479 is known. The bias voltage supplying unit described the foregoing embodiment can be incorporated in the detector of this exemplified imaging apparatus. In this imaging apparatus, a patient's jaw is located in an imaging space between an X-ray tube and a detector, and the pair of the X-ray tube and the detector is rotated around the patient's jaw so that a center of a virtual line connecting the X-ray tube and the detector traces a given trajectory in the imaging space. During this rotation, X-ray beams radiated by the X-ray tube and transmitted through the patient's jaw are detected, at intervals, at intervals by the X-ray detector. The frame data are then subjected to image reconstruction based on a tomosynthesis method, with which the frame data are processed by a shift & add technique, thus providing a tomographic image along a patient's tooth row.

When the bias voltage supplying unit according to the present invention is practiced in this dental panoramic imaging apparatus, it is possible to alleviate irregularities in influences of generation of the dark current and the polarization effect during imaging.

Figure 8:
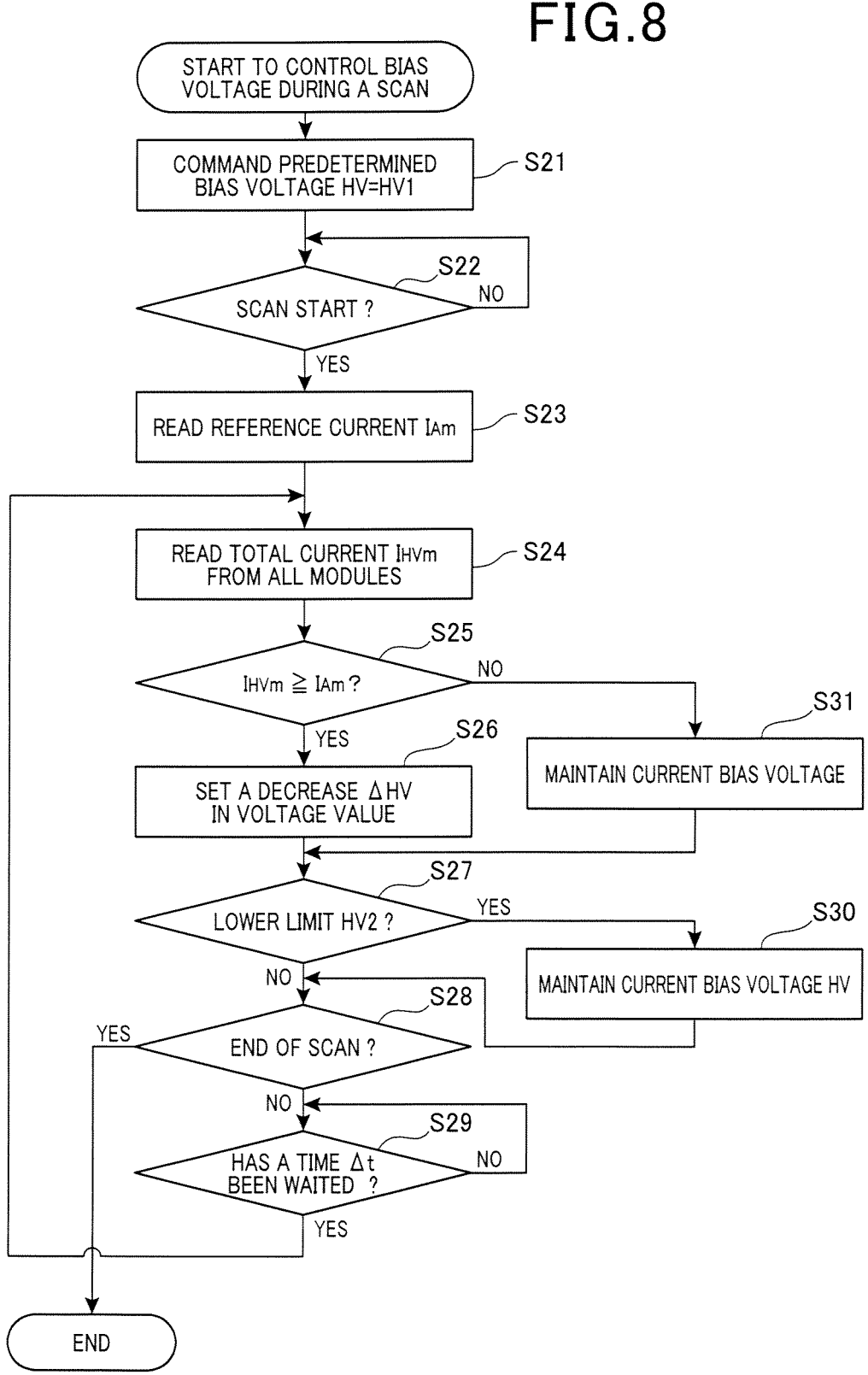
FIG. 8 is a flowchart which outlines control of the bias voltage, which is performed during a scan by a dental panoramic imaging is apparatus, which is according to a modification.

An outline of control of the bias voltage, which is performed by the CPU 34A of the bias voltage control circuit 34 in the above dental imaging, is exemplified in FIG. 8. In this example, components which are the same or identical to those described in the foregoing embodiment are given the same reference numbers for a simplified explanation.

The CPA first issues a command for a predetermined bias voltage HV=−HV1 (for example, −300 V) (step S21). Then, start of imaging, that is, start of a scan is instructed (step S22), the CPU 34A reads a reference value $I_{Am}$ of the foregoing current (step S23). The CPU 34A then reads a value of the current $I_{HVm}$ for all the modules in the same way described (step S24), and makes a comparison about $I_{Am} \leq I_{HVm}$ (step S25).

When the determination at step S25 reveals YES ($I_{Am} \leq I_{HVm}$), an updated bias voltage HV whose value is reduced by ΔHV (e.g. 10V) is commanded as described (step S26). Then it is determined whether or not the present bias voltage HV has arrived at a predetermined lower limit HV2 (for example, −200 V) (step S27). If the present bias voltage HV has not arrived at the lower limit HV2 (NO at step S27), it is then determined whether or not the scan has ended (step S28). If the scan has not ended, i.e., the pair of the X-ray tube and the detector is during the rotation, the processing waits for a predetermined period of time Δt (step S29). After this, the processing is then returned to step S24.

Hence, in a state where the current $I_{HVm}$ flowing between all the modules and the bias voltage generator 31 is higher than the reference value $I_{Am}$, the foregoing steps S24-S28 are repeated. As a result, the control to lower the bias voltage HV is performed at a constant speed $V_{cst}$ (for example, 50 V/sec) until the current $I_{HVm}$ becomes smaller than the reference value $I_{Am}$.

When it is found that the bias voltage HV has arrived at the lower limit HV2 during the control of lowering the bias voltage HV (YES at step S27), the CPU 34A issues a command to keep the current value of the bias voltage HV, i.e., the lower limit HV2 (step S30). After this, the processing proceeds to step S28.

Meanwhile if it is determined NO at step S25 (i.e., $I_{Am} > I_{HVm}$) during the control of lowering the bias voltage HV, the present value of the bias voltage HV (i.e., the predetermined value −HV1 or a value lower than −HV1 but more than −HV2, in which the values are calculated as absolute values) is kept (step S31). Then the processing proceeds to step S27.

When the determination is YES at step S28, the control of the bias voltage will end because of end of the scan. In the foregoing control of the bias voltage, the thresholds can be given hysteresis characteristics.

In this way, this panoramic imaging apparatus has the similar operations and advantages to those obtained in the foregoing embodiment. In the panoramic imaging apparatus, an actual scan time is usually 10 to 20 seconds, but often the next scan will start after a short period of time, particularly, in a screening examination. When the panoramic imaging apparatus is driven without sufficient break times in such a way, operation conditions change due to various factors including a rise in temperature within the apparatus. In addition, environmental conditions such as indoor temperature and humidity also change during the operations. Responsively to such changes, influences of irregularities in the dark current and the polarization effect become larger. Even in such situations, the apparatus according to the present embodiment is able to reduce or remove such influences during the operations, thus improving resolution of images and alleviating artifacts in images.

In the foregoing embodiments and modifications, the bias voltage HV is controlled such that a plurality of modules mounted in the one detector is treated as a one large block and, in this one block, a macro representative value $I_{HVm}$ is used in which the dark currents and the polarization effects at all the pixels are reflected as a mean value. However, the bias voltage supplying unit and the driving technique according to the present invention is not limited to such a mode.

By way of example, a plurality of modules can be divided into a plurality of module groups, in which a total amount of current for each module group is monitored and employed as a representative value, and the same control as the foregoing is performed based on the representative value. In cases where a plurality of modules are mounted, the modules may be classified into two modules groups; one module group consists of one or more modules mounted in an area of the X-ray incidence surface of the detector, which area needs higher detection precision and the most important view, and the other module group consists of one or more modules mounted in the remaining area in which relatively coarser detection is still acceptable. In consideration of this fact, the bias voltage is controlled separately for the one module group to which fine voltage control is assigned and the other module group to which coarse voltage control is assigned. In this case, the bias voltage supplying unit is prepared for each of the module groups and is configured to perform the similar control process to that shown in FIG. 6 or FIG. 8. Hence, priority can be given to the bias voltage control among plural control units in the plural supplying units. Compared with controlling the bias voltage at the same accuracy for all the modules, a calculation load necessary for the total control process can be reduced.

Alternatively, according to circumstances, a plurality of bias voltage supplying units may be prepared for a plurality of modules on a one-on-one manner. The foregoing bias voltage control can thus be performed every module.

Still alternatively, the foregoing bias voltage control may be changed as follows. In the foregoing examples, the detected current $I_{HVm}$ is compared with the reference current $I_{Am}$ to only reduce the bias voltage. Instead of this reduction control, the bias voltage control HV may be raised within a voltage range which is able to keep a current range lower, by a given value, than the reference current $I_{Am}$ when the current $I_{HVm}$ is sufficiently lower than the reference current $I_{Am}$.

It may be thought that this control of raising the bias voltage HV conflicts with the explanation described already, but this does not conflict. The knowledge according to the inventors was obtained in examining bad pixels carried out before assembling a detector. This examination was performed on a mode of "zero count" (no output) and a mode of "not stable" (unstable output). As a result of this examination, the "zero count" was improved by lowering the bias voltage as described. In the meantime, the inventors found that there were cases where the "not stable" performance was improved by increasing the bias voltage, oppositely to the foregoing. It is assumed that, in a case where elements which interrupt electron migrations are dispersed in the CdTe crystal due to its nonuniformity and/or impurity incorporation, a rise in the bias voltage increases migration forces of electrons, thereby overcoming the interruption elements.

Hence, like the foregoing embodiment, the control is not limited to lowering the bias voltage HV depending on the detected current $I_{HVm}$. The bias voltage HV can be controlled to be raised, or controlled to be lowered and raised in a combined manner. These control techniques also make bad pixels appear reliably and an optimum value of the bias voltage HV can be searched.

Furthermore, the bias voltage generator 31 provided in the bias voltage supplying unit 12 is configured to output the bias voltage HV, by itself, responsively to the control signal. An alternative to this configuration can also be provided. On the output side of the bias voltage generator, there is provided a voltage adjusting circuit to increase and/or decrease the bias voltage HV responsively to the control signal, where the bias voltage generator itself always outputs a constant value of the bias voltage HV (for example, −300 V).

In the foregoing embodiments and modifications, the radiation detector is exemplified as the X-ray detector 11 and the bias voltage generator 31 is provided as a power source which supplies the bias voltage. The current sensor 32 is exemplified as the current detector. Moreover, the A/D converter 33 and the bias voltage control circuit 34 compose one example of the bias voltage controller.

As described, the foregoing embodiments and modifications provide how to apply and adjust the bias voltage to the compound semiconductor, in order to obtain a stable detection characteristic from lower X-ray fluxes to higher X-ray fluxes, regardless of which of a photon-counting type detector and an integration type of detector is provided with the compound semiconductor. Adopting the present technique makes it possible to suppress the number of dead pixels to a minimum number and to provide stable images. In addition, if behaviors of pixels change due to various conditions, the performance of radiation detection can be stabilized, whereby images with fewer artifacts can be provided. Of course, the present voltage-application techniques can be also true of gamma rays, not being limited to X-rays, as long as the foregoing various conditions are met.

According to the present technique, an amount of current which flows through the bias voltage supplying unit is monitored, and the value of the bias voltage is reduced when the monitored current amount increases, so that generation of the dark current is reduced. This is performed during imaging or before imaging. In a state where the X-ray flux amount is larger, the detection operation is stable. Hence, detectors which are set to treat dead pixels and process irregularities among pixel outputs in a state where the amount of X-ray fluxes are relatively smaller can also be used in a state where the X-ray flux amount changes.

The present technique is particularly effective for the compound semiconductor made of CdTe or CZT (cadmium zinc telluride) having a Schottky junction. In that compound semiconductor made of CdTe, the solid side is provided as a Pt electrode to which the negative bias voltage is applied, while the pixel-formed side is provided as Al electrodes, so that the electrons are collected. This structure is particularly suitable for the present technique. The reason is as follows. In general, a decrease in the bias voltage results in a proportional delay in an electron migration speed. However, for the electron collections, the electrons can migrate sufficiently faster if the CdTe compound has a thickness of approx. 1 mm. Hence even if the bias voltage is changed within a voltage range approximately ranging from 200 V to 500 V, there will be no significant change in an energy spectrum, where this spectrum indicates how much of X-ray amounts can be counted. In contrast, if present technique is applied to a hole collection or by a combined collection in which the electron and hole collections are combined, the energy spectrum will change significantly if the bias voltage is changed as the foregoing. In such a case, although there will be various effects other than intended by the present invention, it is thought that the effects obtained according to the present invention are not so much.

In order to realize a photon-counting type of CT scanner using the compound semiconductor, it is necessary to improve higher counting rates. For this, it is usual that the pixel size is made smaller, an independent pre-amplifier circuit is constructed pixel by pixel, and/or a pulse duration is made as shorter as possible. For making the pulse duration shorter, it is necessary to move X-ray excited and ionized electric charges to the electrodes at higher speeds in the compound semiconductor. Thus the bias voltage should be used at higher voltages within a bias voltage range which can be used stably.

The technical idea according to the present invention is that, when the amount of X-ray fluxes increases, the bias voltage is reduced. This idea is different from the usual one and unobvious. The present invention is able to achieve maximum effect in collecting electrons, whose movement speed is ten times faster than that of holes.

As a modification of the embodiments, the conventional guard ring to reduce dark current may be employed together with controlling the bias voltage.

PRACTICAL FEATURES OF THE DISCLOSURE

In the present disclosure, especially, a targeted detector is provided such that Schottky-junction CdTe of and electron collection type, whose pixel size is 200 μm×200 μm and whose thickness is 1 mm, is mounted as a photon type of detector. The voltage normally applied to the detector is set to 300 V, and in this applied state, current flowing through the detector is monitored to reduce the bias voltage down to a minimum value of 200 V or thereabout depending on amounts of X-ray fluxes in a controlled manner. A signal forming time at the pre-amplifier is 300 ns, causing no large delay of the waveform in the pre-amplifier. In this case, there are advantages: the defective pixels and outputs do not depend on X-ray fluxes, temperature, humidity, and X-ray radiation time, and are stable; and the counting characteristic is subjected to only a deterioration of several percentages. Hence, a dental conebeam CT scanner can be provided. Compared with acquisition which is not according to the present invention, the present acquisition can improve a yield rate of production of the compound semiconductor and reduce production cost largely. In addition, since current in the bias can be reduced, power consumption can be saved, though its saved amount will be smaller.

For the above reasons, a medical CT scanner whose X-ray fluxes are larger ten times or more than the dental CT scanner can be realized, as long as the detector is made larger in size, to which the foregoing bias voltage control is applied.

According to the present technique, in addition to the CT scanner, an X-ray flat panel, a dental panoramic imaging apparatus adopting the tomosynthesis technique, and a mammography apparatus, image quality can be improved, a yield rate in producing the detector can be raised, and energy consumption can be saved.

In the foregoing, though the monolithic detector is described, a further electrode structure may be adopted, where electrodes are arranged parallel with each other in respect to an X-ray incoming direction and the same bias voltage control to the foregoing is performed. The similar advantages to the foregoing can be provided as well. Any type of compound semiconductor may be used, provided that a Schottky junction is given so as to collect only electrons, only holes, or electrons and holes, which are carriers of current.

Although the photon-counting type of detector is explained chiefly in the foregoing descriptions, the conventional integration type of detector may also adopt this bias voltage control, because this integration type of detector is also confronted with the similar drawbacks.

Recently, new types of compound semiconductors, such as thallium bromide and mercuric iodide, have also been developed, which have the similar operating principle to the foregoing. Hence, the same advantages as those in the foregoing can be provided to such new types of compounded semiconductors.

For the sake of completeness, it should be mentioned that the various embodiments explained so far are not definitive lists of possible embodiments. The expert will appreciates that it is possible to combine the various construction details or to supplement or modify them by measures known from the prior art without departing from the basic inventive principle.

What is claimed is:

1. A radiation detecting apparatus, comprising:
    a radiation detector comprising a semiconductor layer having two surfaces and consisting of a compound semiconductor which directly converts an incoming radiation photon to an electric charge and a pair of electrode layers, each electrode layer stacked on a respective surface of the semiconductor layer, wherein one of the pair of electrode layers is structured into a plurality of collecting electrodes which enable the semiconductor layer to have one-dimensionally or two-dimensionally arrayed pixels;
    a power source that applies a direct-current bias voltage between the pair of electrodes such that the electric charge is collected at one of the pair of electrodes;
    a current detector that detects current supplied from the power source when the power source applies the bias voltage between the pair of electrodes; and
    a bias voltage adjuster that changes a value of the bias voltage applied by the power source, at a constant speed, depending on a value of the current detected by the current detector, wherein the constant speed is set based on both an applied voltage applied to the radiation detector when the radiation detector is used and an acquisition time of the radiation.

2. The radiation detecting apparatus of claim 1, wherein the current detector has the capacity to detect a representative value which represents a quantity of the current during a given period of time, and
    the bias voltage adjuster has the capacity to decrease the value of the bias voltage with an increase in the representative value of the current and to increase the value of the bias voltage with a decrease in the representative value of the current.

3. The radiation detecting apparatus of claim 1, wherein the radiation detector comprises a plurality of modules each comprising the semiconductor layer and the pair of electrodes, and
    the bias voltage adjuster comprises means for controlling the bias voltage individually for every one of the modules or every group of a plurality of groups of modules divided in the modules.

4. The radiation detecting apparatus of claim 1, wherein the bias voltage supplying unit is driven either before or during radiation measurement performed by a radiation system on which the radiation detector is mounted.

5. The radiation detecting apparatus of claim 4, wherein the bias voltage supplying unit is driven before the radiation measurement performed by the radiation system on which the radiation detector is mounted, and
    the apparatus comprises storage means for storing values of the voltage changed by the bias voltage adjuster.

6. The radiation detecting apparatus of claim 1, wherein the constant speed is proportional to a value obtained by dividing the applied voltage applied to the radiation detector per unit time by the acquisition time of the radiation.

7. The radiation detecting apparatus of claim 6, wherein the constant speed is substantially double the value obtained by dividing the applied voltage per unit time by the acquisition time.

8. The radiation detecting apparatus of claim 6, wherein the bias voltage adjuster is configured to increase or decrease the bias voltage at the constant speed between upper and lower limits which are previously set to the bias voltage.

9. The radiation detecting apparatus of claim 8, wherein the compound semiconductor is CdTe (cadmium telluride), CZT (cadmium zinc telluride), TIBr (thallium bromide), or HgI2 (mercury iodide).

10. The radiation detecting apparatus of claim 1, wherein the radiation detector comprises an ASIC (application specific integration circuit) layer in addition to the pair of electrodes and the semiconductor layer, a processing circuit being incorporated in the ASIC layer and processing the electric charge into electrical data indicative of the incoming radiation to the radiation detector, wherein the processing circuit includes a charge amplifier arranged in each channel electrically connected to each of the pixels, the charge amplifier receives via the electrodes an analogue electric signal generated by the semiconductor layer responsively to the incoming radiation photon.

11. The radiation detecting apparatus of claim 1, wherein the power source includes a voltage changing circuit capable of changing the value of the bias voltage, and
    the voltage changing circuit is configured to change the bias voltage depending on a command issued from the bias voltage adjuster.

12. The radiation detecting apparatus of claim 1, wherein the power source is configured to output the bias voltage of a constant value, and the bias voltage adjuster includes a circuit that changes the bias voltage outputted from the power source, depending on the value of the current.

13. A method of adjusting a bias voltage in a radiation detecting apparatus, comprising:
  a radiation detector comprising a semiconductor layer having two surfaces and consisting of a compound semiconductor which directly converts an incoming radiation photon to an electric charge and a pair of electrode layers, each electrode layer stacked on a respective surface of the semiconductor layer, wherein one of the pair of electrode layers is structured into a plurality of collecting electrodes which enable the semiconductor layer to have one-dimensionally or two-dimensionally arrayed pixels; and
  a power source that applies a direct-current bias voltage between the pair of electrodes such that the electric charge is collected at one of the pair of electrodes,
  the method comprising steps of:
  detecting current supplied from the power source when the power source applies the bias voltage between the pair of the electrodes; and
  changing, at a constant speed, a value of the bias voltage applied by the power source, depending on a value of the detected current, the constant speed being based on both a normal applied voltage applied to the radiation detector and an acquisition time of the radiation.

14. The method of adjusting the bias voltage according to claim 13, wherein
  the detecting step of the current detects a representative value which represents a quantity of the current during a given period of time, and
  the changing step of the bias voltage, individually for every one of the modules or every group of a plurality of groups of modules divided in the modules, decreases the value of the bias voltage with an increase in the representative value of the current and to increases the value of the bias voltage with a decrease in the representative value of the current.

15. The method of adjusting the bias voltage according to claim 14, wherein the radiation detector comprises a plurality of modules each comprising the semiconductor layer and the pair of electrodes, and
  the step of changing the bias voltage adjusts the bias voltage individually for every one of the modules or every group of a plurality of groups of modules divided in the modules.

16. A driving apparatus for driving a radiation detecting apparatus comprising a radiation detector comprising a semiconductor layer having two surfaces and consisting of a compound semiconductor which directly converts an incoming radiation photon to an electric charge and a pair of electrode layers, each electrode layer stacked on a respective surface of the semiconductor layer, wherein one of the pair of electrode layers is structured into a plurality of collecting electrodes which enable the semiconductor layer to have one-dimensionally or two-dimensionally arrayed pixels,
  the driving apparatus comprises:
  a power source that applies a direct-current bias voltage between the pair of electrodes such that the electric charge is collected at one of the pair of electrodes;
  a current detector that detects current supplied from the power source when the power source applies the bias voltage between the pair of electrodes; and
  a bias voltage adjuster that changes, at a constant speed, a value of the bias voltage applied by the power source depending on a value of the current detected by the current detector, wherein the constant speed is based on both a normal applied voltage applied to the radiation detector and an acquisition time of the radiation.

17. The driving apparatus of claim 16, wherein the current detector has the capacity to detect a representative value which represents a quantity of the current during a given period of time, and
  the bias voltage adjuster has the capacity to decrease the value of the bias voltage with an increase in the representative value of the current and to increase the value of the bias voltage with a decrease in the representative value of the current.

18. The driving apparatus of claim 17, wherein the radiation detector comprises a plurality of modules each comprising the semiconductor layer and the pair of electrodes, and
  the bias voltage adjuster comprises means for controlling the bias voltage individually for every one of the modules or every group of a plurality of groups of modules divided in the modules.

19. The driving apparatus of claim 18, wherein the bias voltage supplying unit is driven either before or during radiation measurement performed by a radiation system on which the radiation detector is mounted.

* * * * *